(12) United States Patent
Zhu

(10) Patent No.: US 9,325,812 B2
(45) Date of Patent: Apr. 26, 2016

(54) METHOD AND APPARATUS FOR COMPRESSING NESTED PROTOCOL PACKET HEADER

(75) Inventor: Lei Zhu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 218 days.

(21) Appl. No.: 13/566,212

(22) Filed: Aug. 3, 2012

(65) Prior Publication Data

US 2012/0294211 A1 Nov. 22, 2012

Related U.S. Application Data

(63) Continuation of application No. PCT/CN2011/070431, filed on Jan. 20, 2011.

(30) Foreign Application Priority Data

Feb. 3, 2010 (CN) .......................... 2010 1 0104975

(51) Int. Cl.
*H04L 29/08* (2006.01)
*H04L 29/06* (2006.01)
*H04W 28/06* (2009.01)

(52) U.S. Cl.
CPC ................ *H04L 69/04* (2013.01); *H04L 69/22* (2013.01); *H04W 28/06* (2013.01)

(58) Field of Classification Search
CPC .............................. H04W 84/18; H04W 84/12
USPC ................................................. 370/310, 315
See application file for complete search history.

(56) References Cited

U.S. PATENT DOCUMENTS 6,839,339 B1 1/2005 Chuah
2003/0185245 A1* 10/2003 Kang ..................... H04L 69/22
370/503

(Continued)

FOREIGN PATENT DOCUMENTS

CN 1889575 1/2007
CN 1913531 2/2007

(Continued)

OTHER PUBLICATIONS

*Considerations on relay architecture*, 3GPP TSG RAN WG2 #65bis, R2-092425, Mar. 23-27, 2009, Seoul, Korea, pp. 1-4.

(Continued)

*Primary Examiner* — Andrew Lai
*Assistant Examiner* — Zhiren Qin
(74) *Attorney, Agent, or Firm* — Staas & Halsey LLP

(57) ABSTRACT

Embodiments of the present invention disclose a method for compressing a nested protocol packet header, which relate to the field of wireless communication technologies and are used to improve efficiency in compressing a nested protocol packet header in a data packet. The method for compressing a nested protocol packet header provided in the embodiments of the present invention includes: receiving a data packet sent by at least one sending end, where the data packet includes a first compression protocol packet header; taking the received data packet as a whole and nesting a second protocol packet header in it; and processing the data packet nested with the second protocol packet header, where the processing includes: coordinating part of function fields in the first compression protocol packet header and the second protocol packet header to remove a duplicate field, and compressing the second protocol packet header; and sending the processed data packet.

9 Claims, 4 Drawing Sheets

(56) References Cited

U.S. PATENT DOCUMENTS

| | | | |
|---|---|---|---|
| 2004/0004975 A1 | 1/2004 | Shin et al. | |
| 2005/0020216 A1* | 1/2005 | Bune | H04B 7/022 455/101 |
| 2006/0268820 A1* | 11/2006 | Mahkonen | H04W 28/06 370/349 |
| 2009/0310622 A1 | 12/2009 | Whited et al. | |

FOREIGN PATENT DOCUMENTS

| | | |
|---|---|---|
| CN | 101127679 | 2/2008 |
| CN | 102118791 | 7/2011 |
| CN | 102118792 | 7/2011 |
| CN | 102143527 | 8/2011 |
| WO | 2002/043319 | 5/2002 |

OTHER PUBLICATIONS

*Relays Header Compression*, 3GPP TSG-RAN WG2 #67, R2-094307, Aug. 24-28, 2009, Shenzhen, China, pp. 1-3.
*On compression protocol for Un*, 3GPP TSG-RAN WG2 #67, R2-094824, Aug. 24-28, 2009, Shenzhen, China, pp. 1-4.
Wei, Anni, et al., *Nested Compression in ROHC*, Huawei Technologies, Jun. 22, 2010, pp. 1-14.
Office Action, dated Feb. 3, 2010, in corresponding Chinese Application No. 2010101049750 (2 pp.).
Written Opinion of the International Searching Authority, dated Apr. 28, 2011, in corresponding International Application No. PCT/CN2011/070431 (3 pp.).
Extended European Search Report, dated Nov. 21, 2012, in corresponding European Application No. 11739355.3 (6 pp.).
International Search Report, mailed Apr. 28, 2011, in corresponding International Application No. PCT/CN2011/070431 (4 pp.).

\* cited by examiner

METHOD AND APPARATUS FOR COMPRESSING NESTED PROTOCOL PACKET HEADER

CROSS-REFERENCE TO RELATED APPLICATIONS

This application is a continuation of International Application No. PCT/CN2011/070431, filed on Jan. 20, 2011, which claims priority to Chinese Patent Application No. 201010104975.0, filed on Feb. 3, 2010, both of which are hereby incorporated by reference in their entireties.

FIELD OF THE INVENTION

The present invention relates to the field of wireless communication technologies, and in particular, to a method and apparatus for compressing a nested protocol packet header.

BACKGROUND OF THE INVENTION

In an LTE (Long Term Evolution, long term evolution) system where a network relay is deployed, after a relay (Relay) receives a data packet from a UE (User Equipment, user equipment), an IP (Internet Protocol, Internet Protocol)/UDP (User Datagram Protocol, User Datagram Protocol)/GTP-U (GPRS Tunneling Protocol-User plane, GPRS tunneling protocol-user plane) protocol packet header is added to the data packet. In this way, a nested protocol packet header, whose external layer uses an IP/UDP/GTP-U protocol and internal layer uses an IP/UDP/RTP (Real-time Transport Protocol, Real-time Transport Protocol), is formed in the data packet.

Specifically, before sending the data packet to the Relay, the UE needs to compress the IP/UDP/RTP protocol packet header, in this case, the UE uses an IP/UDP/RTP compression profile; after adding an external layer IP/UDP/GTP-U protocol packet header to the data packet, the Relay also compresses it, in this case, the UE uses an IP/UDP/GTP-U compression profile. A nested and compressed data encapsulation format is shown in FIG. 1.

However, in a case where operations of nesting and compression are performed, efficiency in compressing the protocol packet header in the data packet is low.

SUMMARY OF THE INVENTION

Embodiments of the present invention provide a method and apparatus for compressing a nested protocol packet header to improve efficiency in compressing a nested protocol packet header in a data packet.

According to one aspect, a method for compressing a nested protocol packet header is provided, including:

receiving a data packet sent by at least one sending end, where the data packet includes a first compression protocol packet header;

taking the received data packet as a whole and nesting a second protocol packet header in it;

processing the data packet nested with the second protocol packet header, where the processing includes: coordinating part of function fields in the first compression protocol packet header and the second protocol packet header to remove a duplicate field, and compressing the second protocol packet header; and sending the processed data packet.

According to one aspect, an apparatus for compressing a nested protocol packet header is provided, including:

a receiver, configured to receive a data packet sent by at least one sending end, where the data packet includes a first compression protocol packet header;

a nesting unit, configured to take the data packet received by the receiver as a whole and nest a second protocol packet header in it;

a processor, configured to process the data packet nested with the second protocol packet header by the nesting unit, where the processing includes: coordinating part of function fields in the first compression protocol packet header and the second protocol packet header to remove a duplicate field, and compressing the second protocol packet header; and a transmitter, configured to send the data packet processed by the processor.

According to the method and apparatus for compressing a nested protocol packet header provided in the embodiments of the present invention, in the data packet including a nested compression protocol packet header, by borrowing part of the function fields in the first compression protocol packet header at the internal layer and using them in the second compression protocol packet header at the external layer, duplicate function fields are minimized at different layers of the nested protocol packet header, thereby avoiding a duplicate cell function and improving efficiency in compressing the protocol packet header.

DETAILED DESCRIPTION OF THE EMBODIMENTS

The following describes a method and apparatus for compressing a nested protocol packet header, which are provided in the embodiments of the present invention, in detail with reference to accompanying drawings.

Figure 1:
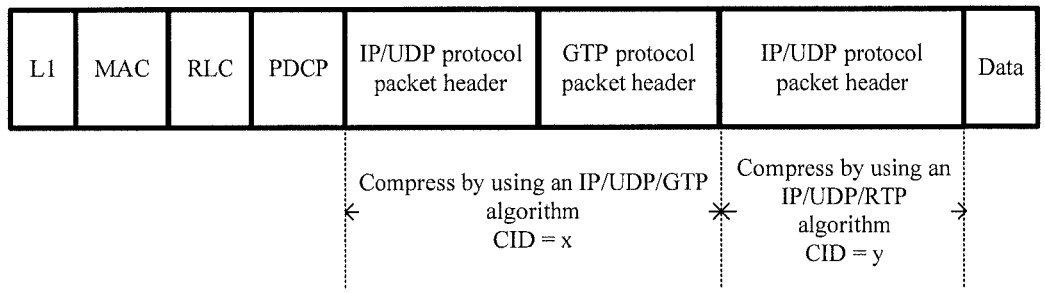
FIG. 1 is a schematic diagram of an encapsulation format of nested and compressed data in the prior art.
Figure 2:
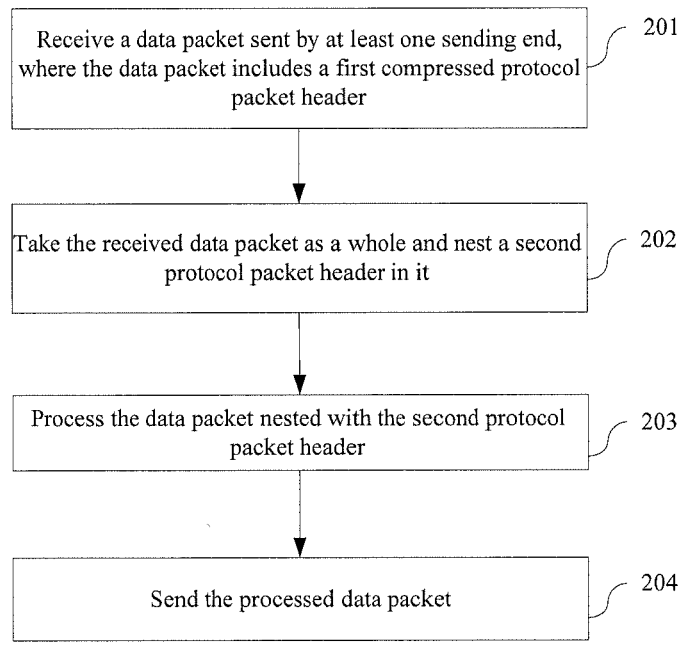
FIG. 2 is a flowchart of a method for compressing a nested protocol packet header according to an embodiment of the present invention.

As shown in FIG. 2, a method for compressing a nested protocol packet header provided in this embodiment includes the following steps:

201. Receive a data packet sent by at least one sending end, where the data packet includes a first compression protocol packet header.

In this embodiment, the data packet is encapsulated and sent by the sending end, and the first compression protocol packet header included in it may be a protocol packet header compressed based on an IP/UDP/RTP protocol. Table 1 shows a format of a header field of the compressed packet based on the IP/UDP/RTP protocol.

TABLE 1

Header field of the IP/UDP/RTP compressed packet header

| 0 | 1 | 2 | 3 | 4 | 5 | 6 | 7 |
|---|---|---|---|---|---|---|---|
| | | | Add-CID octet (extended-context identifier byte) | | | | |
| 1 | 1 | 1 | 1 | 1 | 1 | 0 | x |
| | | | 0-2 octets of CID (0-2-byte context identifier) | | | | |
| | | | Profile (protocol algorithm type) | | | | |
| | | | CRC (cyclic redundancy check) | | | | |
| | | | MSN or LSB (master sequence number/least significant bit) | | | | |
| | | | Profile specific information (protocol type specific information) | | | | |

The CID (Context Identifier) field indicates a context identifier; the ADD-CID indicates a context identifier within a small range, that is, from 0 to 15; the 0-2 octets CID indicates a context identifier within a large range, that is, from 0 to $2^{14}-1=16383$.

The Profile field is used to indicate a specific compression protocol (for example, an IP/UDP/RTP compression profile).

The CRC (Cyclic Redundancy Check, cyclic redundancy check) field is used to perform a CRC check on a decompressor side in order to perform error detection on the received data packet.

The MSN (Master Sequence Number, master sequence number) field is used to maintain a data packet in a compressed header and indicate a sequence of the data packet. An SN of an RTP in the IP/UDP/RTP compression profile is used as an MSN. An LSB (Least Significant Bit, least significant bit) is a part of the MSN, that is, the last eight bits in the MSN.

202. Take the received data packet as a whole and nest a second protocol packet header in it.

In this embodiment, the second protocol packet header may be a protocol packet header based on an IP/UDP/GTP-U protocol.

203. Process the data packet nested with the second protocol packet header. Specifically, the processing includes: coordinating part of function fields in the first compression protocol packet header and the second protocol packet header to remove a duplicate field, and compressing the second protocol packet header.

Because the CRC field and the MSN field are in the nested packet headers at the internal layer and external layer, that is, functions in the first compression protocol packet header and the second compression protocol packet header are similar, a base station is capable of smoothly decompressing a data packet including the nested protocol packet header as long as corresponding parameter information of the CRC field and the MSN field is reserved in the external layer packet header. Therefore, in this embodiment, the function fields that are in the first compression protocol packet header and the second protocol packet header and are to be coordinated include the CRC field and the MSN field.

In the IP/UDP/GTP-U protocol packet header, a CRC field needs to be obtained by recalculation in combination with a CRC field in the IP/UDP/RTP protocol packet header. An MSN field directly uses an MSN field in the IP/UDP/RTP protocol packet header either by duplication or by inheritance.

Meanwhile, to reduce the duplicate field in the IP/UDP/GTP-U protocol packet header and IP/UDP/RTP protocol packet header, the CRC field in the IP/UDP/RTP protocol packet header at the internal layer may be deleted. As regards the MSN field, if the MSN field at the external layer is obtained by copying the MSN field at the internal layer, the MSN field at the internal layer may be deleted to save an air interface resource in transmission; if the MSN field at the external layer is obtained by inheriting the MSN field at the internal layer, the MSN field at the internal layer needs to be reserved.

Certainly, in order to ensure integrity of information, the CRC field and the MSN field at the internal layer may also be reserved.

In this step, the process of coordinating part of the function fields in the first compression protocol packet header and the second protocol packet header to remove the duplicate field and the process of compressing the second protocol packet header may be implemented simultaneously; or parameters in part of the function fields in the first compression protocol packet header and the second protocol packet header are coordinated before the second protocol packet header is compressed. A specific executive sequence is not limited to the foregoing description, and may be adjusted according to an actual need.

204. Send the processed data packet.

In this embodiment, the executive subject of each foregoing step may be a relay, while the sending end may be a user equipment (UE), and a receiving end may be a base station; or the sending end is a base station, while the receiving end is a user equipment; or the sending end and/or the receiving end is another relay. Certainly, this is not limited in an actual situation.

Figure 3:
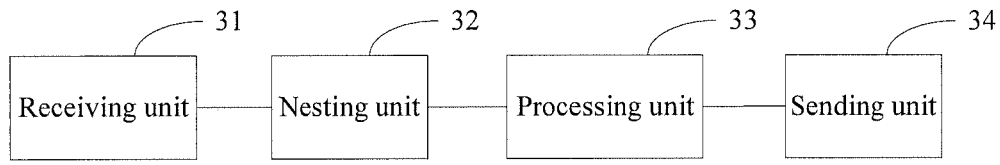
FIG. 3 is a schematic structural diagram of an apparatus for compressing a nested protocol packet header according to an embodiment of the present invention.

This embodiment also provides an apparatus for compressing a nested protocol packet header that can implement the foregoing method. As shown in FIG. 3, the apparatus includes:

a receiving unit 31, configured to receive a data packet sent by at least one sending end, where the data packet includes a first compression protocol packet header;

a nesting unit 32, configured to take the data packet received by the receiving unit 31 as a whole and nest a second protocol packet header in it;

a processing unit 33, configured to process the data packet that is nested with the second protocol packet header by the nesting unit 32, where the processing includes: coordinating part of function fields in the first compression protocol packet header and the second protocol packet header to remove a duplicate field, and compressing the second protocol packet header; and a sending unit 34, configured to send the data packet processed by the processing unit 33.

In this embodiment, the foregoing apparatus for compressing a nested protocol packet header may be a relay or part of functional modules of the relay, while the sending end may be a user equipment (UE), and the receiving end may be a base station; or the sending end is a base station, while the receiving end is a user equipment; or the sending end and/or the receiving end is another relay. Certainly, this is not limited in an actual situation.

According to the method and apparatus for compressing a nested protocol packet header provided in this embodiment, in the data packet including a nested compression protocol packet header, by borrowing part of the function fields in the first compression protocol packet header at the internal layer and using them in the second compression protocol packet header at the external layer, duplicate function fields are minimized at different layers of the nested protocol packet header, thereby avoiding a duplicate cell function and improving efficiency in compressing the protocol packet header.

To describe the solutions provided in the embodiments of the present invention more clearly, the following further describes the foregoing method with reference to a specific method embodiment.

Figure 4:
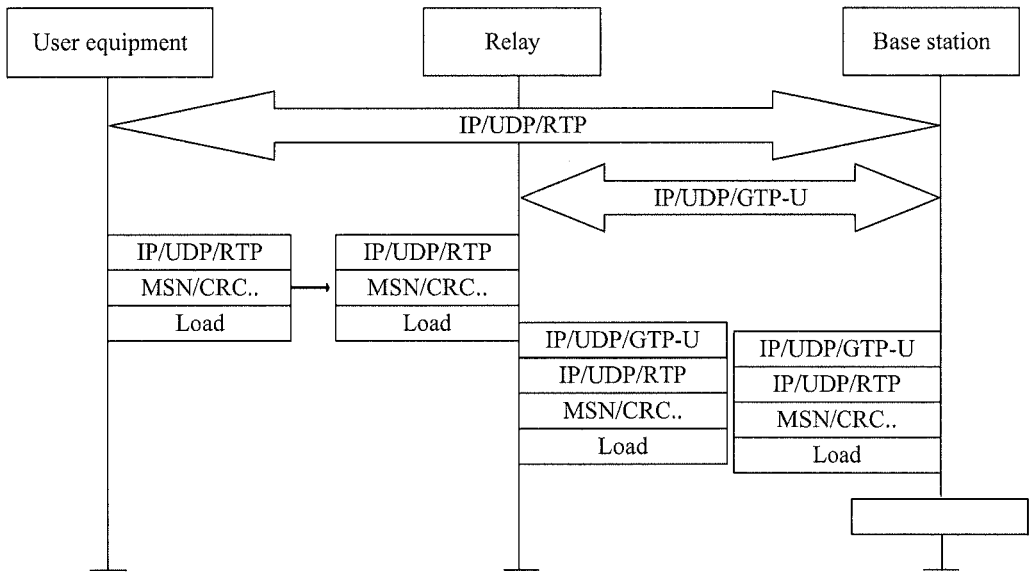
FIG. 4 is a flowchart of signaling of a nested compression manner according to a method embodiment of the present invention.

In this embodiment, the method may be applied to a similar scenario below: a user equipment (UE) sends a data packet to a base station through a relay (Relay). In this case, the user equipment only creates context information (Connection Context) between the user equipment and the base station. Therefore, after receiving the data packet, the relay does not decompress it. As shown in FIG. 4, after receiving the data packet sent by the user equipment, the relay directly nests a second protocol packet header at the external layer of the original compression protocol packet header in the data packet, and then compresses the second protocol packet header and sends it to the base station.

Figure 5:
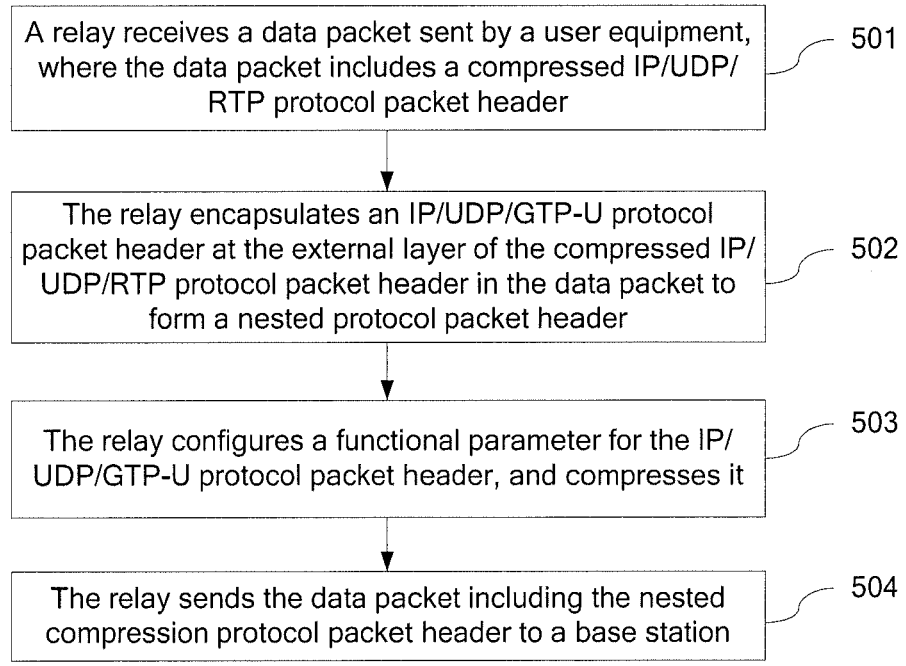
FIG. 5 is a flowchart of the method for compressing a nested protocol packet header according to the method embodiment shown in FIG. 4.
Figure 6:
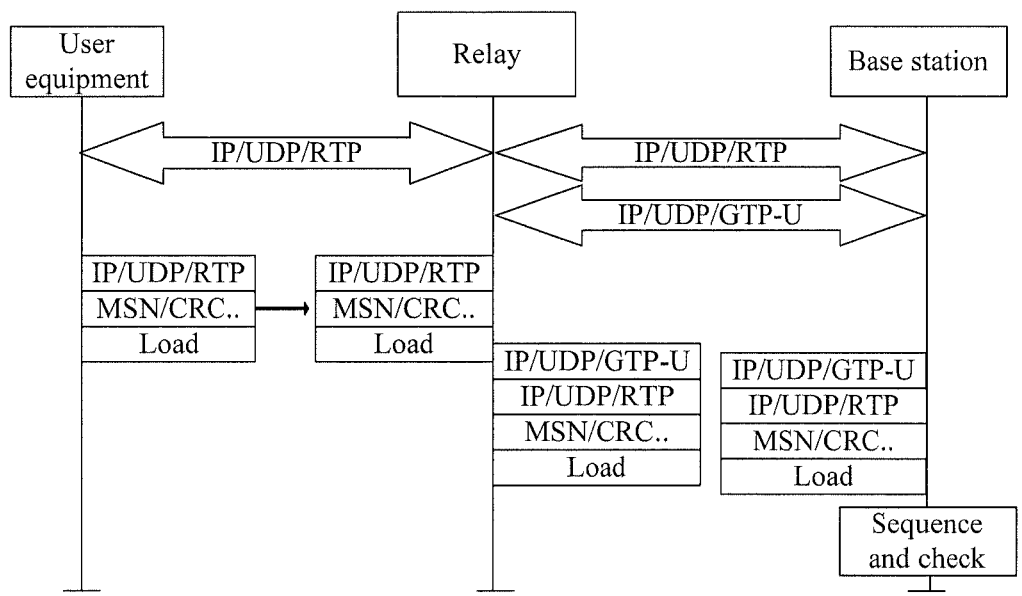
FIG. 6 is a flowchart of signaling of a nested compression manner according to another method embodiment of the present invention.

As shown in FIG. 5, a method for compressing a nested protocol packet header provided in this embodiment includes the following steps:

501. A relay receives a data packet sent by a user equipment, where the data packet includes a compressed IP/UDP/RTP protocol packet header.

502. The relay encapsulates an IP/UDP/GTP-U protocol packet header at the external layer of the compressed IP/UDP/RTP protocol packet header in the data packet to form a nested protocol packet header.

503. The relay configures a functional parameter for the IP/UDP/GTP-U protocol packet header, coordinates part of function fields in the IP/UDP/RTP protocol packet header and the IP/UDP/GTP-U protocol packet header to remove a duplicate field, and compresses the IP/UDP/GTP-U protocol packet header to obtain an IP/UDP/GTP-U compression protocol packet header.

The part of function fields described here may include a CRC field and an MSN field. In addition, the IP/UDP/GTP-U protocol packet header is compressed by using an IP/UDP/GTP-U compression profile.

In the process of configuring the functional parameter in the IP/UDP/GTP-U protocol packet header, the CRC field needs to be obtained by recalculation. As regards the MSN field, an MSN field in the IP/UDP/RTP protocol packet header at the internal layer of the nested protocol packet header may be borrowed and used.

Specifically, when parameters are configured for the CRC field, a sum of values in the data packet including the nested protocol packet header may firstly be calculated, that is, a sum of CRC dynamic fields in the data packet is calculated. The calculating the sum here is to connect multiple CRC dynamic fields, for example, if a field A is 10110 and a field B is 01110, the sum is 1011001110. Then, a remainder of the obtained sum divided by a specific generator polynomial (for example, a generator polynomial $C(x)=1+x+x^3$) is calculated. The sum is used as an information field and the remainder is used as a check field, where the information field and the check field are simultaneously written into a CRC field in the IP/UDP/GTP-U protocol packet header, and a CRC field in the IP/UDP/RTP protocol packet header is set to null or deleted.

Two manners may be available for configuring parameters for the MSN field:

Manner 1:

The MSN field in the IP/UDP/RTP protocol packet header at the internal layer is directly copied to the IP/UDP/GTP-U protocol packet header at the external layer, and meanwhile the MSN field in the IP/UDP/RTP protocol packet header is set to null or deleted.

In this case, by using manner 1 to set an MSN field which is in the IP/UDP/GTP-U protocol packet header at the external layer, in combination with the foregoing setting of the CRC field, a nested IP/UDP/GTP-U compressed packet header at the external layer shown in Table 2 and an IP/UDP/RTP compressed packet header at the internal layer shown in Table 3 are obtained.

TABLE 2

| Header field of the nested IP/UDP/GTP-U compressed packet header | | | | | | | |
|---|---|---|---|---|---|---|---|
| 0 | 1 | 2 | 3 | 4 | 5 | 6 | 7 |
| 1 | 1 | 1 | Add-CID octet 1 0-2 octets of CID Profile CRC MSN or LSB Profile specific information | 1 | 1 | 0 | x |

In the IP/UDP/GTP-U protocol compressed packet header as shown in Table 2, a numerical value recorded in the CRC field is obtained by recalculation, and a numerical value recorded in the MSN field is obtained by directly copying all or part of master sequence numbers in the MSN field in the original IP/UDP/RTP protocol packet header, that is, the MSN or LSB shown in Table 2.

TABLE 3

| Header field of the nested IP/UDP/RTP compressed packet header | | | | | | | |
|---|---|---|---|---|---|---|---|
| 0 | 1 | 2 | 3 | 4 | 5 | 6 | 7 |
| 1 | 1 | 1 | Add-CID octet 1 0-2 octets of CID Profile Profile specific information | 1 | 1 | 0 | x |

After a base station side receives the data packet including the nested protocol packet header, only function information carried in the protocol packet header at the external layer is used. Therefore, as shown in Table 3, the original CRC field and MSN field in the IP/UDP/RTP protocol compressed packet header at the internal layer are already set to null, and certainly, the CRC field and/or the MSN field in the IP/UDP/RTP protocol compressed packet header at the internal layer may also be deleted. In this way, a processing delay and a load of the protocol packet header may be reduced, and efficiency in compressing the protocol packet header may be improved. To ensure integrity of information, information recorded in the CRC field and the MSN field may be reserved in the IP/UDP/RTP protocol compressed packet header.

Manner 2:

An inherit context identifier (Inherit CID) is set in the MSN field in the IP/UDP/GTP-U protocol packet header at the external layer, where the Inherit CID is used to indicate a location of the MSN field in the IP/UDP/RTP protocol packet header.

In this case, by using manner 2 to set the MSN field which is in the IP/UDP/GTP-U protocol packet header at the external layer, in combination with the foregoing setting of the CRC field, a nested IP/UDP/GTP-U compressed packet header at the external layer shown in Table 4 and an IP/UDP/RTP compressed packet header at the internal layer shown in Table 5 are obtained.

TABLE 4

Header field of the nested IP/UDP/GTP-U compressed packet header

| 0 | 1 | 2 | 3 | 4 | 5 | 6 | 7 |
|---|---|---|---|---|---|---|---|
|   |   |   | Add-CID octet |   |   |   |   |
| 1 | 1 | 1 | 1 | 1 | 1 | 0 | x |
|   |   |   | 0-2 octets of CID |   |   |   |   |
|   |   |   | Profile |   |   |   |   |
|   |   |   | CRC |   |   |   |   |
|   |   |   | Inherit CID |   |   |   |   |
|   |   |   | Profile specific information |   |   |   |   |

In the IP/UDP/GTP-U protocol compressed packet header shown in Table 4, the numerical value recorded in the CRC field is obtained by recalculation, and the Inherit CID recorded in the MSN field indicates the location of the MSN field in the IP/UDP/RTP protocol packet header at the internal layer, that is, the MSN field in the IP/UDP/GTP-U protocol packet header at the external layer is inherited from the IP/UDP/RTP protocol packet header at the internal layer. In this way, a receiving end may read, according to an indication of the Inherit CID, an MSN or a least significant bit (LSB) in the MSN in a corresponding location in the IP/UDP/RTP protocol packet header at the internal layer. Only an indicator, Inherit CID, rather than a complete master sequence number, is written in the MSN field of the IP/UDP/GTP-U protocol packet header, which reduces the load of the protocol packet header and improves the compressing efficiency in subsequent compression processes.

TABLE 5

Header field of the nested IP/UDP/RTP compressed packet header

| 0 | 1 | 2 | 3 | 4 | 5 | 6 | 7 |
|---|---|---|---|---|---|---|---|
|   |   |   | Add-CID octet |   |   |   |   |
| 1 | 1 | 1 | 1 | 1 | 1 | 0 | x |
|   |   |   | 0-2 octets of CID |   |   |   |   |
|   |   |   | Profile |   |   |   |   |
|   |   |   | MSN or LSB |   |   |   |   |
|   |   |   | Profile specific information |   |   |   |   |

As shown in Table 5, the original CRC field in the IP/UDP/RTP protocol compressed packet header at the internal layer is already set to null. Certainly, the CRC field in the IP/UDP/RTP protocol packet header at the internal layer may also be deleted directly. In this way, the processing delay and the load of the protocol packet header may be reduced, and the efficiency in compressing the protocol packet header may be improved. To ensure the integrity of the information, the information recorded in the CRC field may be reserved in the IP/UDP/RTP protocol packet header.

504. The relay sends the data packet including a nested compression protocol packet header to the base station.

The nested compression protocol packet header mentioned here is a nested compression protocol packet header whose internal layer is based on the IP/UDP/RTP protocol and external layer is based on the IP/UDP/GTP-U protocol.

In this embodiment, because the relay does not decompress the data packet after receiving the data packet, but directly nests an IP/UDP/GTP-U protocol packet header in the original IP/UDP/protocol packet header, the relay does not modify the original context (Context) between the user equipment and the base station, but establishes a context, which is between the relay and the base station, for the nested IP/UDP/GTP-U protocol packet header at the external layer in an IP packet header, where the IP packet header carries the context between the user equipment and the base station, which is specifically as shown in Table 6.

TABLE 6

IP packet header carrying a nested and compressed context

| L1 header field | L2 header field | IP/UDP/GTP-U | IP/UDP/RTP | Load |
|---|---|---|---|---|
|   |   | <--- ROHC compressing--> Between the relay and the base station | <--- ROHC compressing--> Between the UE and the base station |   |

After receiving data packet including the nested compression protocol packet header, the base station performs decompression and a CRC check on the data packet according to the obtained and known context.

If other relay nodes exist between the current relay and the base station, the foregoing steps need to be repeated, and at least one compression protocol packet header is nested again in the data packet. Reference may be made to the foregoing step 503 for the process of configuring parameters for the protocol packet header at the external layer, which is not repeatedly described here.

In this embodiment, the solution provided in this embodiment is described according to an example where a UE side sends data to a base station side. A case where the base station side sends data to the UE side is approximately the same.

According to the method for compressing a nested protocol packet header provided in this embodiment, in a data packet including a nested compression protocol packet header, part of the function fields in the IP/UDP/RTP compression protocol packet header at the internal layer is borrowed and used in the IP/UDP/GTP-U compression protocol packet header at the external layer. In addition, a duplicate field in the IP/UDP/RTP protocol packet header at the internal layer is set to null or deleted. In this way, duplicate function fields are minimized at different layers of the nested protocol packet header, thereby avoiding duplicate cell functions and improving the efficiency in compressing the protocol packet header.

To describe the solutions provided in the embodiments of the present invention more clearly, the following further describes the method shown in FIG. 2 with reference to a specific method embodiment.

After the solution provided in the embodiment corresponding to FIG. 5 is used, a base station performs decompression and a CRC check on the data packet after receiving a data packet forwarded by a relay. However, even in a case that it is learnt by the CRC check that an error occurs in the process of transmitting the data packet, whether the error occurs in the process of transmitting the data packet by a user equipment to the relay or the error occurs in the process of transmitting the data packet by the relay to the base station still cannot be accurately identified.

Therefore, in this embodiment, the solutions of the present invention may also be applied in the following similar scenario: A user equipment (UE) sends a data packet to a base station through a relay (Relay). In this case, the user equipment creates a context between the user equipment and the relay. Therefore, after receiving the data packet, the relay decompresses the data packet according to the context between the user equipment and the relay. As shown in FIG.

6, after receiving the data packet from the user equipment, the relay firstly decompresses the received data packet, then nests a second protocol packet header at the external layer of an original protocol packet header, compresses the data packet which includes a nested packet header as a whole, and sends the compressed data packet to the base station.

Figure 7:
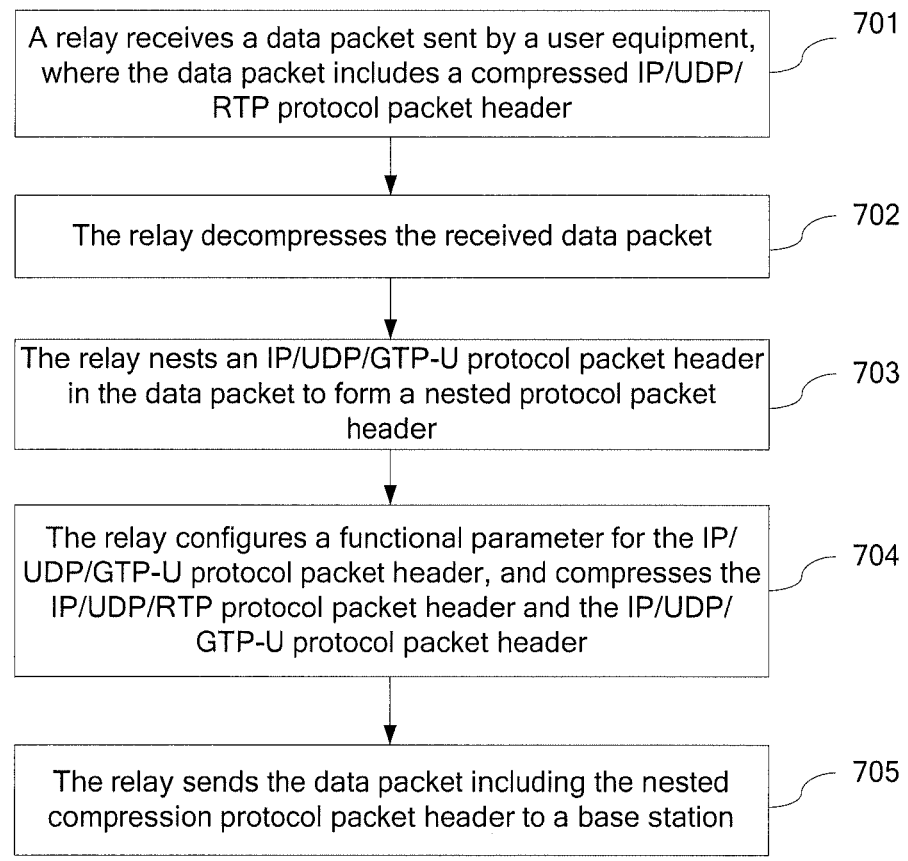
FIG. 7 is a flowchart of the method for compressing a nested protocol packet header according to the method embodiment shown in FIG. 6.

As shown in FIG. 7, a method for compressing a nested protocol packet header provided in this embodiment specifically includes the following steps:

701: A relay receives a data packet sent by a user equipment, where the data packet includes a compressed IP/UDP/RTP protocol packet header.

702: The relay decompresses the received data packet.

After the data packet is decompressed, a CRC field carried in the IP/UDP/RTP protocol packet header may be obtained, so that a CRC check may be performed on the current received data packet to check whether an error occurs in the process of sending the data packet by the user equipment to the relay. If an error occurs, the user equipment is required to resend the data packet; if no error occurs, subsequent steps are performed.

703: The relay nests an IP/UDP/GTP-U protocol packet header in the data packet to form a nested protocol packet header.

704: The relay configures a functional parameter for the IP/UDP/GTP-U protocol packet header, coordinates part of function fields in the IP/UDP/RTP protocol packet header and the IP/UDP/GTP-U protocol packet header to remove a duplicate field, and compresses the IP/UDP/RTP protocol packet header and the IP/UDP/GTP-U protocol packet header to obtain an IP/UDP/RTP compression protocol packet header and an IP/UDP/GTP-U compression protocol packet header, respectively.

An IP/UDP/RTP compression profile is used when the IP/UDP/RTP protocol packet header is compressed, while an IP/UDP/GTP-U compression profile is used when the IP/UDP/GTP-U protocol packet header is used.

In the process of configuring the functional parameter in the IP/UDP/GTP-U protocol packet header, the CRC field needs to be obtained by recalculation. As regards an MSN field, an MSN field in the IP/UDP/RTP protocol packet header at the internal layer of the nested protocol packet header may be used.

Specifically, as regards setting of the parameters in the CRC field and the MSN field, an implementing manner and parameters that are set are the same as those described in step 503 according to the embodiment corresponding to FIG. 5, which is not repeatedly described here.

705: The relay sends the data packet which includes a nested compression protocol packet header to a base station.

The nested compression protocol packet header mentioned here is a nested compression protocol packet header whose internal layer is based on an IP/UDP/RTP protocol and external layer is based on an IP/UDP/GTP-U protocol.

In this embodiment, the relay firstly decompresses the data packet after receiving it, adds the IP/UDP/GTP-U protocol packet header to the data packet, and then compresses the IP/UDP/RTP protocol packet header and the IP/UDP/GTP-U protocol packet header to obtain a nested compression protocol packet header, respectively.

Similarly, in such a scenario, the relay adds context information between the relay and the base station to a decompressed IP packet header that carries context information, which is specifically as shown in Table 7:

TABLE 7

IP packet header carrying nested and compressed context information

| L1 header field | L2 header field | IP/UDP/GTP-U | IP/UDP/RTP | Load |
|---|---|---|---|---|
| | | <--- ROHC compressing--> Between the relay and the base station | <--- ROHC compressing--> Between the UE and the relay | |

After receiving the data packet which includes the nested compression protocol packet header, the base station performs decompression and the CRC check on the data packet according to the known context information. In this case, if it is learnt by the CRC check that an error exists in the received data packet, it indicates that an error occurs in the process of sending the data packet by the relay to the base station, and the base station sends a message to the relay to require that the relay resend the data packet.

If other relay nodes exist between the current relay and the base station, the foregoing steps need to be repeated, and at least one compression protocol packet header is nested again in the data packet. Reference may be made to step 503 according to the embodiment corresponding to FIG. 5 for the process of configuring parameters for the protocol packet header at the external layer, which is not repeatedly described here.

In this embodiment, the solution provided in this embodiment is described by using an example where a UE side sends data to a base station side. A case where the base station side sends data to the UE side is approximately the same.

According to the method for compressing a nested protocol packet header provided in this embodiment, in the data packet including a nested compression protocol packet header, part of the function fields in the IP/UDP/RTP compression protocol packet header at the internal layer and are borrowed and used in the IP/UDP/GTP-U compression protocol packet header at the external layer. In addition, a duplicate field in the IP/UDP/RTP protocol packet header at the internal layer is set to null or deleted. In this way, duplicate function fields are minimized at different layers of the nested protocol packet header, thereby avoiding a duplicate cell function and improving efficiency in compressing the protocol packet header.

In the foregoing embodiment, the solution provided in the embodiment corresponding to FIG. 5 is simple, convenient, and easy to implement for the whole system; and the solution provided in the embodiment corresponding to FIG. 7 is capable of accurately indentifying a phase at which a transmission error occurs, thereby improving transmission efficiency. In a specific implementation process, one manner or a combination of the foregoing two manners may be selected according to a specific environment requirement.

To describe the solutions provided in the embodiments of the present invention more clearly, the following further describes the method shown in FIG. 2 with reference to another specific method embodiment.

This embodiment may be applied in the following similar scenario: At least two user equipments send data packets to a same base station through a same relay, where each of the data packets includes an IP/UDP/RTP protocol packet header.

In this embodiment, after receiving the data packets from the at least two user equipments, the relay may take the received data packets as a whole and nest a second protocol packet header in it, that is, a same second protocol packet header (that is, an IP/UDP/GTP-U protocol packet header) may be used to encapsulate and compress the data packets of the at least two user equipments, and then the data packet including a nested compression protocol packet header is sent to the base station. The nested compression protocol packet header is a compressed nested protocol packet header whose internal layer includes at least two IP/UDP/RTP protocol packet headers and external layer includes an IP/UDP/GTP-U protocol packet header.

The foregoing solution of encapsulating and compressing the data packets which are correspond to the at least two user equipments by using the same IP/UDP/GTP-U protocol packet header may also be applicable to scenarios involved in the embodiments which correspond to FIG. 5 and FIG. 7, respectively. That is, after the relay receives the data packets sent by the at least two user equipments, no matter whether the relay decompresses the data packets and nests the second protocol packet header in them, or the relay does not decompress the data packets but directly nests the second protocol packet header in them, a plurality of data packets sent to the same base station may be encapsulated uniformly. In this way, more air interface resources may be saved in data transmission.

The process of configuring parameters for the protocol packet header is different from that described in the embodiments which correspond to FIG. 5 and FIG. 7, respectively, in that: In this embodiment, because data packets of at least two user equipments are involved, to determine a value of a CRC field in the IP/UDP/GTP-U protocol packet header at the external layer of the nested compression protocol packet header, a sum of values of the whole data packet after being nested and before being compressed needs to be calculated, the obtained sum is written into the CRC field in the IP/UDP/GTP-U protocol packet header, and CRC fields in the at least two IP/UDP/RTP protocol packet headers at the internal layer are all set to null or deleted.

Two implementing manners are available for determining a value of an MSN filed in the IP/UDP/GTP-U protocol packet header at the external layer:

One is to directly copy an MSN field in one IP/UDP/RTP protocol packet header of the at least two IP/UDP/RTP protocol packet headers at the internal layer to the IP/UDP/GTP-U protocol packet header at the external layer, and meanwhile set all the MSN fields, which are in the at least two IP/UDP/RTP protocol packet headers at the internal layer, to null or delete them.

A second one is to set an inherit context identifier (Inherit CID) in the MSN field in the IP/UDP/GTP-U protocol packet header at the external layer, where the Inherit CID is configured to indicate a location of an MSN in one IP/UDP/RTP protocol packet header of the at least two IP/UDP/RTP protocol packet headers, and meanwhile set all the MSN fields, which are in other IP/UDP/RTP protocol packet headers of the at least two IP/UDP/RTP protocol packet headers, to null or delete them.

Certainly, to ensure integrity of data, the foregoing CRC fields and the MSN fields in the at least two IP/UDP/RTP protocol packet headers at the internal layer may be reserved.

If multiple relays exist between the user equipment and the base station, each relay implements a process of nesting the compression protocol packet header after receiving the data packets. Reference may be made to the description in the foregoing steps for each process of nesting the compression protocol packet header, which is not repeatedly described here.

In this embodiment, the solution provided in this embodiment is described by using an example where a UE side sends data to a base station side. A case where the base station side sends data to the UE side is approximately the same.

According to the method for compressing a nested protocol packet header provided in this embodiment, the IP/UDP/RTP protocol packet headers corresponding to the data packets of at least two user equipments are encapsulated into a same IP/UDP/GTP-U protocol packet header; meanwhile, part of function fields in a certain IP/UDP/RTP compression protocol packet header at the internal layer are borrowed and used in the IP/UDP/GTP-U compression protocol packet header at the external layer; and unnecessary duplicate fields in the IP/UDP/RTP at the internal layer are set to null or deleted. In this way, duplicate function fields are minimized at different layers of the nested protocol packet header, thereby avoiding a duplicate cell function, saving air interface resources in the data transmission, and improving efficiency in compressing the protocol packet header.

Figure 8:
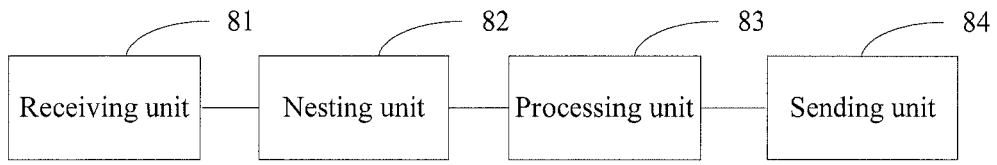
FIG. 8 is a schematic structural diagram of an apparatus for compressing a nested protocol packet header according to an apparatus embodiment of the present invention.

Corresponding to the foregoing embodiment of the method, the embodiments of the present invention further provides an apparatus embodiment. As shown in FIG. 8, the apparatus for compressing a nested protocol packet header provided in this embodiment includes a receiving unit 81, a nesting unit 82, a processing unit 83, and a sending unit 84.

The receiving unit 81 receives a data packet from at least one sending end, where the data packet includes a first compression protocol packet header. The first compression protocol packet header here may be a compressed IP/UDP/RTP protocol packet header. The nesting unit 82 takes the data packet received by the receiving unit 81 as a whole and nests a second protocol packet header in it, where the second protocol packet header here may be an IP/UDP/GTP-U protocol packet header. The processing unit 83 processes the data packet which is nested with the IP/UDP/GTP-U protocol packet header by the nesting unit 82, where the processing includes: coordinating part of function fields in the IP/UDP/RTP protocol packet header and the IP/UDP/GTP-U protocol packet header to remove a duplicate field, and compresses the IP/UDP/GTP-U protocol packet header. Then, the sending unit 84 sends the data packet which includes a nested compression protocol packet header and is output by the processing unit 83, where the nested compression protocol packet header includes the nested first compression protocol packet header and second protocol packet header.

The part of function fields processed by the processing unit 83 may include a CRC field and an MSN field.

Further, in the process of implementing parameter configuration of the CRC field, the processing unit 83 may be configured to: calculate a sum of values of the data packet which is nested with the second protocol packet header, use the obtained sum as an information field, write it and a check field into a cyclic redundancy check filed in the second protocol packet header, and set a cyclic redundancy check field, which is in the first compression protocol packet header, to null or delete it, where the check field is obtained by calculating a remainder of the sum divided by a generator polynomial.

In addition, in the process of implementing parameter configuration of an MSN field, the processing unit 83 may be further configured to: write a master sequence number, which is in the first compression protocol packet header in a data packet sent by a certain sending end of the at least one sending end, into a master sequence number field in the second protocol packet header, and set a master sequence number field, which is in the first compression protocol packet header in the data packet of the at least one sending end, to null or delete it; or, The processing unit 83 may be further configured to: set an inherit context identifier in a master sequence number field in the second protocol packet header, where the inherit context identifier is configured to indicate a location of a master sequence number in the first compression protocol packet header in a data packet which is sent by a certain sending end of the at least one sending end, and set master sequence number fields, which are in the first compression protocol packet headers in data packets that are sent by other sending ends of the at least one sending end, to null or delete them.

In this embodiment, the foregoing apparatus for compressing a nested protocol packet header may be a relay or part of functional modules of the relay, while the sending end may be a user equipment (UE), and the receiving end may be a base station; or the sending end is a base station, while the receiving end is a user equipment; or the sending end and/or the receiving end is another relay.

According to the apparatus for compressing a nested protocol packet header provided in this embodiment, in the data packet including a nested compression protocol packet header, part of function fields in the IP/UDP/RTP compression protocol packet header at the internal layer and are borrowed and used in the IP/UDP/GTP-U compression protocol packet header at the external layer, and a duplicate field in the IP/UDP/RTP protocol packet header at the internal layer is set to null or deleted. In this way, duplicate function fields are minimized at different layers of the nested protocol packet header, thereby avoiding a duplicate cell function and improving efficiency in compressing the protocol packet header.

The solutions of compressing a nested protocol packet header provided in the embodiments of the present invention are not limited to be implemented by a relay, but also applicable to the compressing of a nested protocol packet header in a process of performing multilayer nested compressing on a data packet by one or multiple apparatuses other than the relay.

Through the descriptions of the preceding implementing manners, those skilled in the art may understand that the present invention may be implemented by software plus a necessary hardware platform, and certainly may also be implemented all by hardware. Based on such understandings, all or part of contributions made by the technical solutions of the present invention to the background art may be embodied in the form of a software product. The software product may be stored in a storage medium, for example, a ROM/RAM, a magnetic disk, or a compact disk, which includes several instructions to instruct a computer device (which may be a personal computer, a server, or a network device) to execute the method according to each embodiment of the present invention or some certain parts of the embodiments.

The foregoing descriptions are merely specific embodiments of the present invention, but are not intended to limit the scope of the present invention. Any modification or replacement that may be easily thought out by persons skilled in the art without departing from the technical scope disclosed in the present invention shall fall within the scope of the present invention. Therefore, the protection scope of the present invention is subject to the protection scope of the appended claims.

What is claimed is:

1. A method for compressing a nested protocol packet header, comprising:
   performing by a computing apparatus:
      receiving a data packet sent by at least one sending end, wherein the data packet comprises a first compression protocol packet header;
      forming a nested protocol packet header by combining the first compression protocol packet header with a second protocol packet header for forwarding of the received data packet;
      processing the nested protocol packet header with the first compression protocol packet header and the second protocol packet header by:
         coordinating a duplicate function field of the first compression protocol packet header which is a duplicate of a function field of the second protocol packet header with the function field of the second protocol packet header, based upon using at least part of information of the duplicate function field of the first compression protocol packet header in the function field of the second protocol packet header, to thereby remove the duplicate function field of the first compression protocol packet header from the first compression protocol packet header, and
         compressing the second protocol packet header; and
      forwarding by sending the nested protocol packet header which includes the first compression protocol packet header with the duplicate function field removed and the second protocol packet header,
      wherein the duplicate function field of the first compression protocol packet header comprises a cyclic redundancy check (CRC) field or a master sequence number (MSN) field.

2. The method for compressing the nested protocol packet header according to claim 1,
   wherein the coordinating the duplicate function field of the first compression protocol packet header which is the duplicate of the function field of the second protocol packet header with the function field of the second protocol packet header comprises:
   calculating a sum of values of the received data packet including the second protocol packet header, and
   writing the sum of values and a check field into a CRC field in the second protocol packet header,
   wherein the CRC field is removed from the first compression protocol packet header by being set to null or deleted.

3. The method for compressing the nested protocol packet header according to claim 1,
   wherein the coordinating the duplicate function field of the first compression protocol packet header which is the duplicate of the function field of the second protocol packet header with the function field of the second protocol packet header comprises:
   writing a MSN of the MSN field of the first compression protocol packet header into a MSN field in the second protocol packet header,
   wherein the MSN field of the first compression protocol packet header is removed by being set to null or deleted.

4. The method for compressing the nested protocol packet header according to claim 1,
   wherein the coordinating the duplicate function field of the first compression protocol packet header which is the duplicate of the function field of the second protocol packet header with the function field of the second protocol packet header comprises:
   setting an inherit context identifier in a MSN field of the second protocol packet header, the inherit context identifier is configured to indicate a location of a MSN of the first compression protocol packet header,
   wherein MSN fields in first compression protocol packet headers in data packets of other sending ends are removed by being set to null or deleted.

5. A non-transitory computer readable storage medium storing computer program code, which, when executed by computer hardware of a user terminal, will cause the computer hardware of the user terminal to perform the method according to claim 1.

6. An apparatus for compressing a nested protocol packet header, comprising:
  a receiver, configured to receive a data packet sent by at least one sending end, wherein the data packet comprises a first compression protocol packet header;
  a processor, configured to:
    form a nested protocol packet header by combining the first compression protocol packet header with a second protocol packet header for forwarding of the received data packet;
    process the nested protocol packet header with the first compression protocol packet header and the second protocol packet header by:
    coordinating a duplicate function field of the first compression protocol packet header which is a duplicate of a function field of the second protocol packet header with the function field of the second protocol packet header, based upon using at least part of information of the duplicate function field of the first compression protocol packet header in the function field of the second protocol packet header,
    to thereby remove the duplicate function field of the first compression protocol packet header from the first compression protocol packet header, and
    compress the second protocol packet header; and
  a transmitter, configured to forward by sending the protocol packet header which includes the first compression protocol packet header with the duplicate function field removed and the second protocol packet header,
  wherein the duplicate function field of the first compression protocol packet header comprises a cyclic redundancy check (CRC) field or a master sequence number (MSN) field.

7. The apparatus for compressing the nested protocol packet header according to claim 6,
  wherein the processor is configured to:
  calculate a sum of values of the received data packet including the second protocol packet header, and
  write the sum of values and a check field into a CRC field in the second protocol packet header,
  wherein the CRC field is removed from the first compression protocol packet header by being set to null or deleted.

8. The apparatus for compressing the nested protocol packet header according to claim 6,
  wherein the processor is configured to:
  write a MSN of the MSN field of the first compression protocol packet header into a MSN field in the second protocol packet header,
  wherein the MSN field of the first compression protocol packet header is removed by being set to null or deleted.

9. The apparatus for compressing the nested protocol packet header according to claim 6,
  wherein the processor is configured to:
  set an inherit context identifier in a MSN field of the second protocol packet header, the inherit context identifier is configured to indicate a location of a MSN of the first compression protocol packet header,
  wherein MSN fields in first compression protocol packet headers in data packets of other sending ends are removed by being set to null or deleted.

\* \* \* \* \*